Patented May 9, 1950

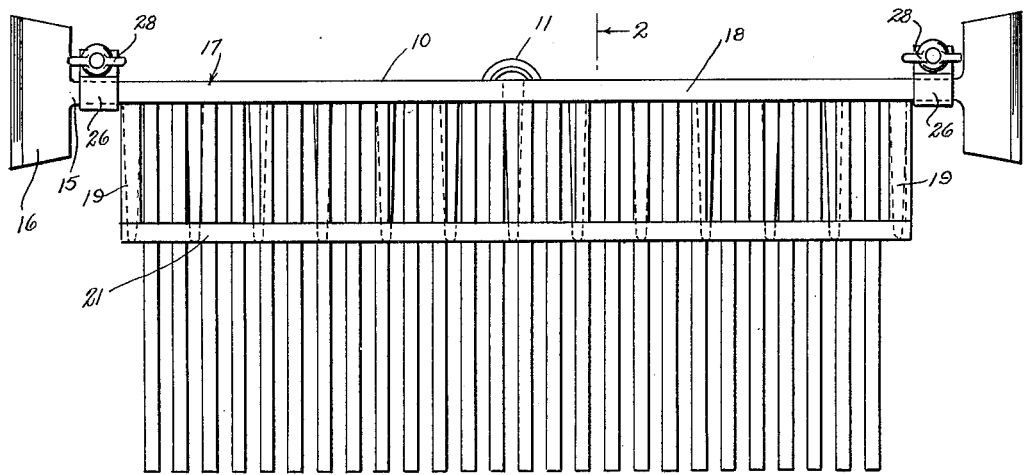
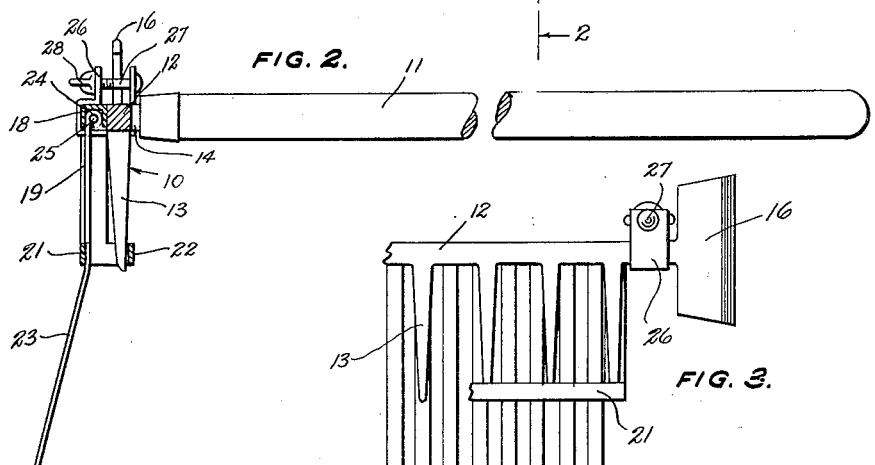
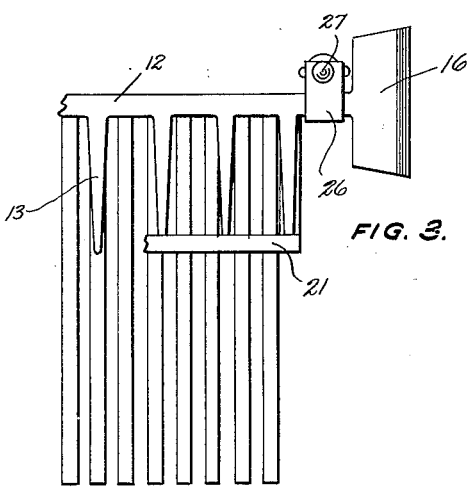

2,506,993

UNITED STATES PATENT OFFICE 2,506,993

COMBINED GRASS AND LEAF RAKE

Jacob A. Campbell, Arden, Del.

Application January 24, 1947, Serial No. 724,021

3 Claims. (Cl. 56—400.04)

This invention relates to a combined grass and leaf rake, and more particularly to a leaf rake attachment adapted to be connected to an ordinary grass rake.

It is an object of the present invention to provide a leaf rake attachment which can be connected to an ordinary grass rake to convert the grass rake into a leaf rake.

It is another object of the present invention to provide a leaf rake attachment for an ordinary grass rake which is of simple construction, cheap to manufacture, easy to attach to the grass rake, and which is efficient in operation.

For other objects and for a better understanding of the invention, reference may be had to the following detailed description taken in connection with the accompanying drawings, in which:

Figure 1 is an end face view of the attachment secured to the grass rake and in position to be used for raking leaves.

Figure 2 is a cross-sectional view taken on line 2—2 of Figure 1, and looking in the direction of the arrows thereof.

Figure 3 is a fragmentary view of a portion of the grass rake and of the attachment which is attached thereto, and looking from the rear and upon the grass rake teeth which are in the rear of the leaf rake teeth.

Referring now to the figures, 10 represents a grass rake having a handle 11 for drawing the rake over the ground. The grass rake includes a transverse bar 12 having depending teeth 13. The grass rake 10 is connected to the handle in the usual manner by means of a pin projection 14 which is driven into the end of the handle 11. The transverse bar 12 has extensions 15 on the opposite ends of the same which are fashioned into weed-cutting tools 16. At times the rake can be turned on its side and used to cut weeds with one of the tools 16. It is, however, to be understood that only one end of the transverse bar 12 may be equipped with such a weed-cutting tool 16, if so desired. The extensions 15 also serve for the attachment to the rake of a leaf rake attachment, indicated generally at 17.

This leaf rake attachment includes a transverse member or channel 18 open at its bottom and having depending portions 19 extending downwardly therefrom and adapted to carry on their lower ends a transverse looped member 21 which is adapted to embrace the ends of the rake teeth 13. Extending upwardly through the looped member 21 are a plurality of spaced spring teeth 23, each of which is provided with a curved attaching portion 24 at its upper end for attachment to a rod 25 extending through the channel 18 and serving to maintain the curved portions 24 within the channel. The rod 25 extends from end to end of the channel and is retained within the channel by the tight fitting engagement of the exterior faces of the curved portions 24 with the interior surfaces of the channel 18. The channel is fixed to the extensions 15 of the grass rake by clamp fastening devices 26 adapted to surround the channel and the transverse portion 12, or extensions 15, of the rake, and be made secure by a bolt 27 and a wing nut 28. As the leaf attachment is put to use, the spring teeth 23 will be drawn rearwardly toward and against the bottom ends of the grass rake teeth 13. It will now be apparent that an ordinary grass rake has been converted by this attachment into a leaf rake with spring teeth.

Having now described my invention, I claim:

1. A leaf raking attachment for use with garden rakes including an elongated transverse bar and spaced depending teeth secured to the bar, said attachment comprising a member to be detachably secured to the forward side of the transverse bar, depending elements secured to the member and terminating near the free ends of the depending teeth and disposed forwardly of such teeth, an elongated transverse loop secured to the depending elements and having a side disposed adjacent to the rear sides of the teeth for engagement with the teeth, a plurality of spaced long resilient leaf raking teeth secured to the member and arranged within the loop and free from attachment to the loop, the leaf raking teeth extending beyond the free ends of the first named teeth, and clamp means connected with the member for detachably securing it to the forward side of the transverse bar.

2. A leaf raking attachment for use with garden rakes including an elongated transverse bar and spaced depending teeth secured to the bar, said attachment comprising an elongated transverse member to be detachably secured to the transverse bar, spaced depending elements secured to the member and terminating near the free ends of the teeth and spaced forwardly of the teeth, an elongated transverse loop secured to the bottom ends of the elements and surrounding the teeth and having its rear side substantially contacting the teeth at their rear sides and near their free ends, the forward side of the loop being spaced forwardly of the teeth, a plurality of spaced long resilient leaf raking teeth secured to the member and depending therefrom and extending through the loop and below the free ends of the first named teeth for a substantial distance, the resilient leaf raking teeth being free from attachment to the loop and normally extending close to the forward side of the loop, and clamp means connected with the member for detachably securing it to the transverse bar.

3. A leaf raking attachment for use with garden rakes including an elongated transverse bar and spaced depending teeth secured to the bar, said attachment comprising an elongated transversely extending inverted channel to be detachably clamped to the forward side of the transverse bar, spaced depending strips secured to the forward side of the channel and terminating near and forwardly of the free ends of the depending teeth, an elongated transverse loop having a forward side secured to the lower ends of the depending strips and a rear side disposed at the rear of the teeth and substantially contacting the teeth, an elongated rod to be secured between the sides of the channel and extending longitudinally of the channel, spaced resilient leaf raking teeth arranged within the loop and extending beyond the free ends of the first-named teeth and having their upper ends surrounding the rod for securing the leaf raking teeth to the rod, the upper ends surrounding the rod engaging between the sides of the inverted channel for securing the rod between such sides, and a clamp for detachably clamping the channel to the forward side of the transverse bar.

JACOB A. CAMPBELL.

REFERENCES CITED

The following references are of record in the file of this patent:

UNITED STATES PATENTS

| Number | Name | Date |
|---|---|---|
| 157,439 | Brinckerhoff | Dec. 8, 1874 |
| 1,628,994 | Orren | May 17, 1927 |